M. J. McTIGHE.
VEHICLE COUPLING AND STEERING DEVICE.
APPLICATION FILED JUNE 16, 1916.
1,237,355.
Patented Aug. 21, 1917.
2 SHEETS—SHEET 2.
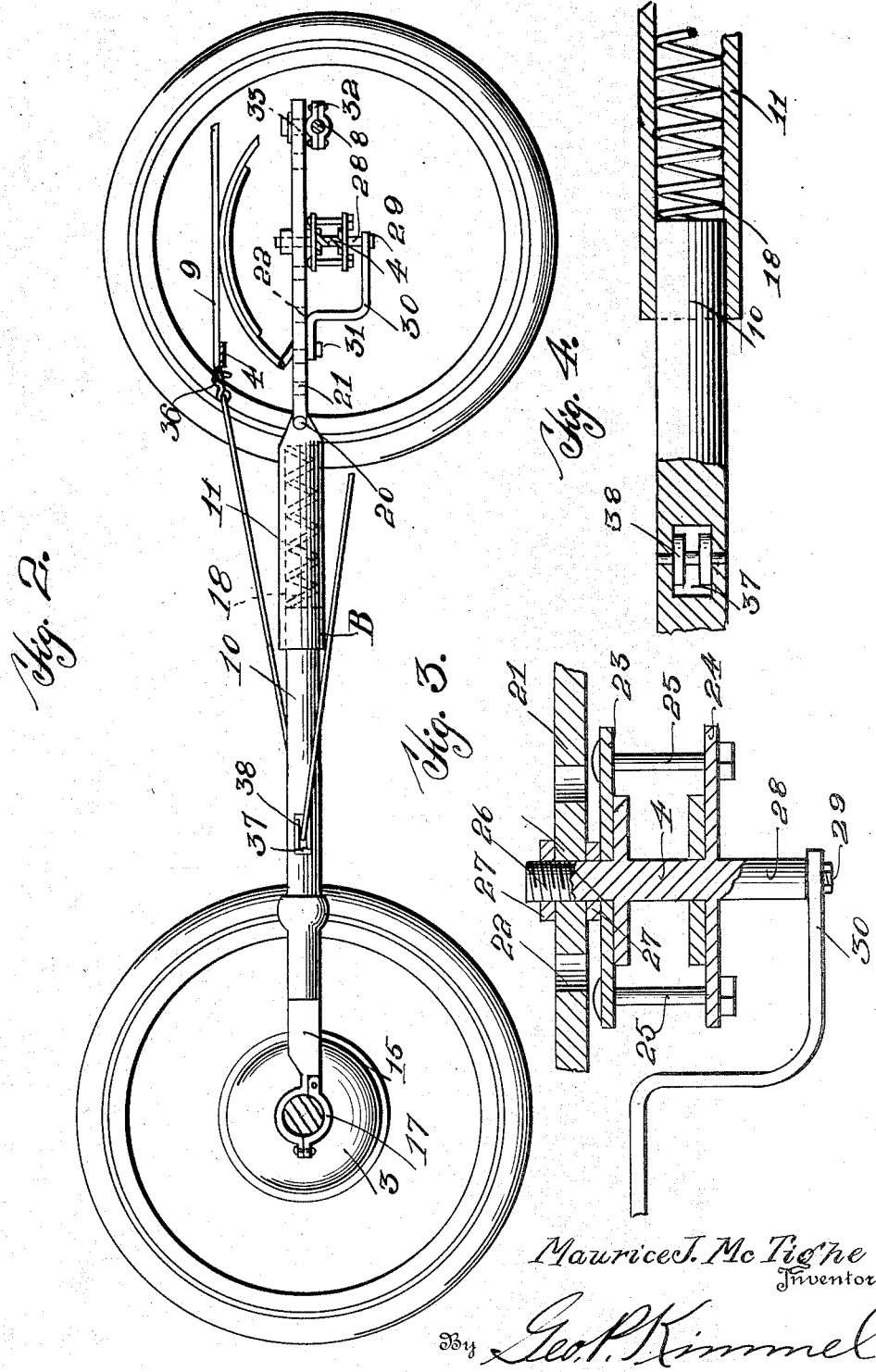
Maurice J. McTighe
Inventor
By Geo. P. Kimmel
Attorney

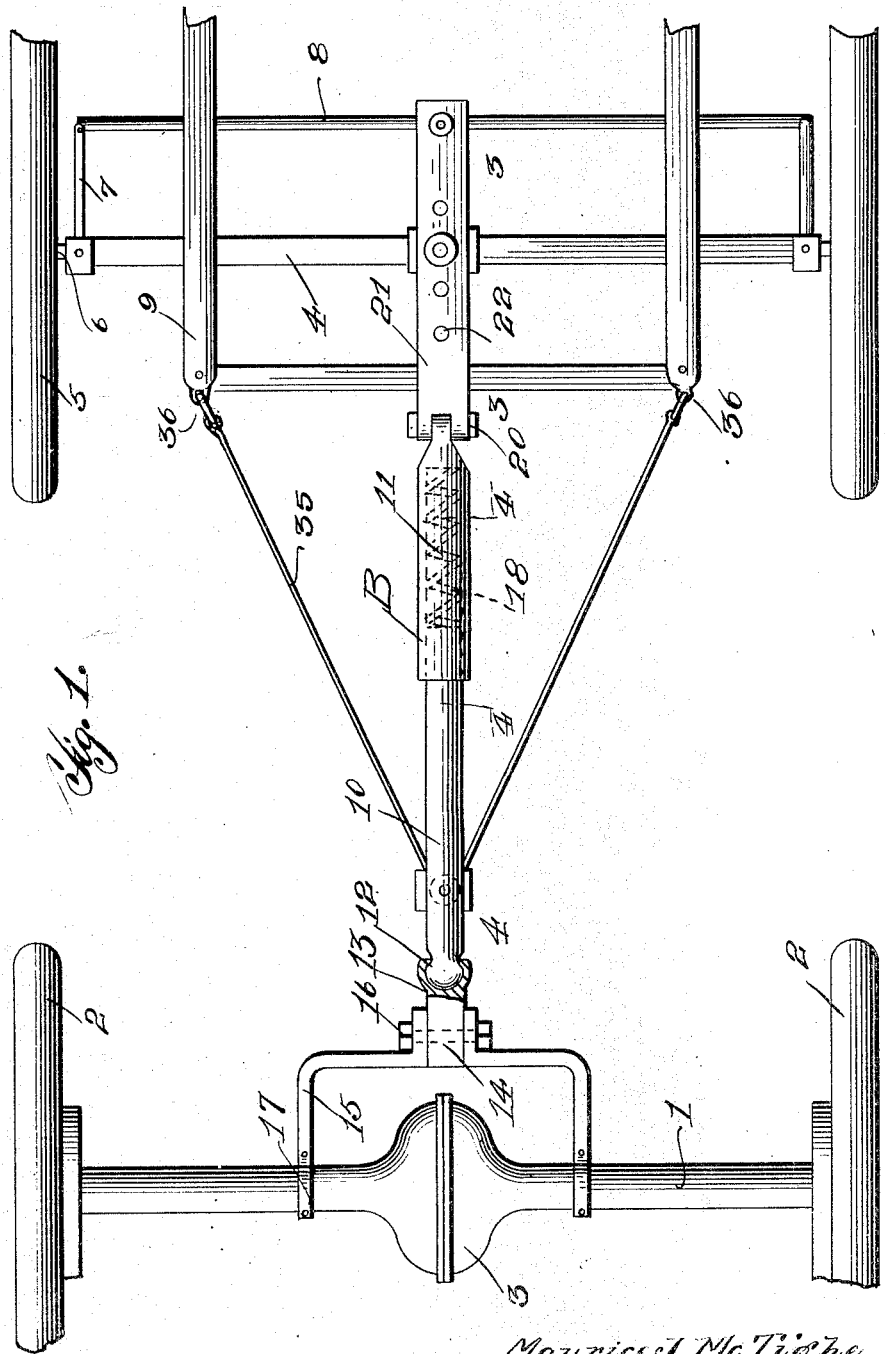

UNITED STATES PATENT OFFICE.

MAURICE J. McTIGHE, OF IROQUOIS, SOUTH DAKOTA.

VEHICLE COUPLING AND STEERING DEVICE.

1,237,355.  Specification of Letters Patent.  Patented Aug. 21, 1917.

Application filed June 16, 1916. Serial No. 104,008.

*To all whom it may concern:*

Be it known that I, MAURICE J. MCTIGHE, a citizen of the United States, and resident of Iroquois, in the county of Kingsbury and State of South Dakota, have invented certain new and useful Improvements in Vehicle Coupling and Steering Devices, of which the following is a specification.

The present invention relates to vehicle coupling devices and has particular reference to new and useful improvements in towing devices for trackless vehicles, motor or otherwise.

While I do not limit my invention to the use hereinafter set forth it is designed primarily and its principal object is, to provide an improved and novel type of coupling device for connecting two or more vehicles of the motor type for towing purposes, it being possible for one driver to handle a train of coupled vehicles by merely properly steering the leading vehicle of the train. Thus, in the event that an automobile becomes stalled the device of my invention may serve to quickly and easily couple securely the "rescuing" vehicle with the stalled vehicle, one driver handling both of the vehicles.

Another object of my invention is to provide a device of the character described having means associated therewith for connecting the same to the steering gear of the trailing vehicle for steering the latter.

A further object of my invention is to provide a device of the character described, which is simple in construction, strong and durable, light, and cheap to manufacture.

Other objects and advantages to be derived from the use of my improved coupling device will appear from the following detail description and the claims, taken with an inspection of the accompanying drawings, in which:—

Figure 1 is a top plan view of a towing or coupling device embodying the improvement of my invention;

Fig. 2 is a side elevational view of the same, a portion of the same being broken away;

Fig. 3 is a longitudinal sectional view taken on the line 3—3 of Fig. 1 looking in the direction of the arrows; and Fig. 4 is a longitudinal sectional view taken on the line 4—4 of Fig. 1.

Referring more particularly to the drawings, wherein similar characters of reference designate like and corresponding parts throughout the various views, 1 designates the rear axle of a towing motor vehicle and 2 the driving wheels thereof. The axle 1 is provided with the usual differential 3. The structure described in the foregoing forms no essential part of my invention merely being shown to illustrate one application of the device. The forward end of a motor vehicle which is to be towed is shown, the usual front axle 4 having steering wheels 5 carried on stub-axles 6 being illustrated in Figs. 1 and 2. The arms 7 extend from the stub-axles and are connected by the transverse rod 8. The rod 8 is connected with the usual steering mechanism of the motor vehicle. The structure described in the foregoing forms no essential part of my invention but is merely shown to illustrate one application of the coupling device. The frame of the vehicle being towed is shown, the same being designated 9.

The coupling device of my invention includes a coupling bar designated B in its entirety and composed of telescopically associated sections 10 and 11, the section 10 being received within the section 11. For convenience in describing I shall term the section 10 the forward section and the section 11 the rearward section hereinafter.

The forward portion of the section 10 is provided with a ball 12 engageable in a socket 13 carried by the rear end of a block 14, said block being associated with the towing vehicle by means of offset arms 15 bolted as at 16 to said block. The free ends of the arms are in clamping engagement as at 17 with the rear axle 1.

A coiled spring element 18 is disposed in the section 11 engaged by the section 10 and the rear end wall of the section 11, said spring element serving to maintain the sections in extended position, but permitting telescoping of the same. The rear end portion of the section 11 is hingedly connected as at 20 with a flat bar 21, said bar having a plurality of apertures 22 therein for a purpose which will hereinafter appear. The hinge 20 is so arranged that when laterally moving the sections 10 and 11 and the bar 21 the same operate as a rigid structure, but the hinge permits vertical movement of the free end portions of the sections.

The bar 21 is pivoted on the front axle 4 for lateral movement relative thereto, the means for pivoting the same including top and bottom clamping plates 23 and 24, respectively, connected by fastening bolts 25 or the like. The plates and bolts embrace the front axle serving to rigidly mount a threaded trunnion 26 carried by the plates 23. The trunnion 26 is adapted to receive the bar 21 extending through one of the openings 22 in said bar, suitable retaining and supporting nuts 27 being provided. The bottom plate 24 is likewise provided with a trunnion 28 formed with a reduced threaded portion 29 for receiving the lower free end of a brace 30, the upper free end of said brace connecting as at 31 with the bar 21. In this manner the bar 21 is freely movable laterally on the trunnion 26 but is prevented from possible lost motion vertically.

The rear end of the bar 21 is connected with the transverse rod 8 of the steering mechanism of the trailing vehicle, a clamp 32 carried by a bearing rod 33 associated with said bar 21 serving to form said connection. A plurality of openings are provided in the bar 21 to adjust the clamping member in accordance with the adjustment of the bar and in accordance with the various sizes of steering mechanism. It will be seen that the connection provided between the rod 21 and the rod 8 affords a connection permitting turning of the clamping member 32 to accommodate itself to the movement of the steering mechanism of the trailing vehicle.

In order to return the coupler B to central position I provide a cable 35, the free ends of which are connected by hooks 36 or the like to the chassis 9 of the trailing vehicle. The intermediate portion of the cable 35 passes through an opening 7 formed in the forward section 10, the pulley 38 being journaled in said opening to accommodate said cable. It will be seen that the cable 35, by virtue of its coöperation with the frame 18 serves to bring the coupling B back to the center position after a lateral swinging motion of the same. However, this does not prevent coupling of two vehicles when out of alinement. It will also be seen that the spring 18 not only serves a useful purpose in so far as the centering of the coupling B is concerned but also serves as shock absorbing means between the towing and trailing vehicle, particularly when coming to a stop.

In operation the device is connected as shown in Figs. 1 and 2, and when the towing vehicle negotiates a turn the coupling B is turned relative to the trailing vehicle, this by virtue of the rigid connection of the arms 15 to the towing vehicle. It will be readily apparent that when the coupling B is swung on its pivot 26 the rod 8 will be moved laterally causing the steering wheels 5 to be swung to the proper angle and in the proper direction for making the turn. It will be readily apparent that it is unnecessary that a driver be placed in the trailing vehicle, and it will also be apparent that the mechanism employed for coupling the vehicles is extremely simple and may be applied by one man. The adjustable features of the device permit of its application to automobiles and the like of various sizes thereby making the device a necessity for all garages and the like.

From the above description taken in connection with the accompanying drawings, it is thought that a clear and comprehensive understanding of the construction, operation and advantages of my invention may be had, and while I have shown and described my invention as embodying a specific structure, I desire that it be understood that I may make such changes in said structure as do not depart from the spirit and scope of the invention as claimed.

Having thus fully described my invention, what I claim as new and desire to secure by Letters Patent, is:—

1. The combination with a towing vehicle and a vehicle to be towed, of a coupling and steering mechanism therefor, comprising telescopically related sections, the forward section having universal connection with the towing vehicle, a rearward section having pivotal connection with the trailing vehicle and with the steering mechanism thereof, shock absorbing means interposed between said sections, and a flexible element engaged with the coupling and having its ends connected with the chassis of the trailing vehicle to maintain the coupler in a neutral position after a steering operation.

2. A device of the class described, including telescopically related sections, shock absorbing means associated therewith, one of said sections having universal connection with a towing vehicle, the other of said sections having pivotal connection with a vehicle to be towed, hinged means associated with second said section to permit vertical movement of the sections, and a flexible element engaging the coupling and having its ends connected with the vehicle in tow to return the sections to center position after a steering movement.

3. A coupling comprising telescopic sections adapted to be connected to the steering gear of a trailer, a pulley mounted on one of the sections, a buffer spring interposed between the telescopic sections tending to extend the sections, and a flexible element adapted to be connected at each end to the frame of the trailer, and having its bight portion passed over the pulley, said flexible element being held taut by the action of the buffer spring.

In testimony whereof, I affix my signature hereto.

MAURICE J. McTIGHE.